(12) United States Patent
Soong et al.

(10) Patent No.: US 8,085,711 B2
(45) Date of Patent: Dec. 27, 2011

(54) METHOD AND SYSTEM FOR MANAGING RADIO RESOURCES FOR SOFT HANDOFF IN AN OFDMA-BASED COMMUNICATION SYSTEM

(75) Inventors: Anthony C. K. Soong, Plano, TX (US); Zhigang Rong, San Diego, CA (US); Jianmin Lu, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1141 days.

(21) Appl. No.: 11/844,332

(22) Filed: Aug. 23, 2007

(65) Prior Publication Data

US 2008/0090574 A1    Apr. 17, 2008

Related U.S. Application Data

(60) Provisional application No. 60/839,972, filed on Aug. 24, 2006.

(51) Int. Cl.
*H04W 4/00* (2009.01)

(52) U.S. Cl. ........ 370/328; 370/331; 370/338; 455/436; 455/442

(58) Field of Classification Search ................ None
See application file for complete search history.

(56) References Cited

U.S. PATENT DOCUMENTS

| | | | |
|---|---|---|---|
| 5,664,108 A | 9/1997 | Heaton et al. | |
| 5,867,763 A | 2/1999 | Dean et al. | |
| 5,946,621 A | 8/1999 | Chheda et al. | |
| 5,956,641 A * | 9/1999 | Bruckert et al. | 455/442 |
| 6,038,450 A | 3/2000 | Brink et al. | |
| 6,047,186 A | 4/2000 | Yu et al. | |
| 6,069,871 A | 5/2000 | Sharma et al. | |
| 6,507,567 B1 * | 1/2003 | Willars | 370/321 |
| 6,654,363 B1 * | 11/2003 | Li et al. | 370/338 |
| 6,985,736 B1 * | 1/2006 | Aalto | 455/447 |
| 7,006,828 B1 | 2/2006 | Czaja et al. | |
| 7,042,858 B1 * | 5/2006 | Ma et al. | 370/331 |
| 7,043,244 B1 * | 5/2006 | Fauconnier | 455/442 |
| 2002/0058511 A1 | 5/2002 | Mohebbi | |
| 2002/0077124 A1 | 6/2002 | Hunzinger | |
| 2003/0045321 A1 | 3/2003 | Kim et al. | |
| 2003/0081538 A1 | 5/2003 | Walton et al. | |

(Continued)

FOREIGN PATENT DOCUMENTS

CN    1653844 A    8/2005

(Continued)

OTHER PUBLICATIONS

"Air Interface Evolution Framework Proposal," 3rd Generation Partnership Project 2, Mar. 27, 2006, pp. 1-68, Huawei Technologies Co., Ltd., et al.

(Continued)

*Primary Examiner* — Anthony Sol
(74) *Attorney, Agent, or Firm* — Slater & Matsil, L.L.P.

(57) ABSTRACT

A method and system is disclosed for managing resource within a predetermined soft handoff group in an OFDM based telecommunications system. Logical radio resources are separated into at least one set to support the soft handoff group and at least one set for supporting normal communication traffic. At least one physical radio resource is identified for each logical radio resource in the set for supporting the SHOG according to a predetermined mapping function so as to minimize resource collision.

23 Claims, 4 Drawing Sheets

U.S. PATENT DOCUMENTS

| | | | |
|---|---|---|---|
| 2003/0152174 A1 | 8/2003 | Burke | |
| 2004/0132457 A1* | 7/2004 | Sanders et al. | 455/450 |
| 2005/0288025 A1 | 12/2005 | Yoshida et al. | |
| 2005/0288027 A1 | 12/2005 | Cho et al. | |
| 2006/0003767 A1 | 1/2006 | Kim et al. | |
| 2006/0182063 A1* | 8/2006 | Ma et al. | 370/331 |
| 2006/0252428 A1* | 11/2006 | Agashe et al. | 455/436 |
| 2006/0285601 A1* | 12/2006 | Julian et al. | 375/260 |
| 2006/0293056 A1* | 12/2006 | Kim et al. | 455/442 |
| 2007/0097918 A1 | 5/2007 | Cai et al. | |
| 2007/0135153 A1* | 6/2007 | Cai et al. | 455/522 |
| 2007/0195742 A1* | 8/2007 | Erdman et al. | 370/338 |
| 2007/0224989 A1 | 9/2007 | Soong et al. | |
| 2007/0243871 A1 | 10/2007 | Chen et al. | |
| 2007/0268975 A1* | 11/2007 | Yoon et al. | 375/260 |
| 2008/0025337 A1* | 1/2008 | Smith et al. | 370/439 |
| 2008/0076429 A1 | 3/2008 | Comstock et al. | |
| 2008/0090574 A1 | 4/2008 | Soong et al. | |
| 2008/0268844 A1* | 10/2008 | Ma et al. | 455/436 |
| 2009/0061778 A1* | 3/2009 | Vrzic et al. | 455/62 |
| 2009/0129334 A1* | 5/2009 | Ma et al. | 370/331 |
| 2009/0201872 A1* | 8/2009 | Gorokhov et al. | 370/329 |
| 2010/0142471 A1* | 6/2010 | Cheng et al. | 370/329 |

FOREIGN PATENT DOCUMENTS

| | | |
|---|---|---|
| EP | 1 189 468 A1 | 3/2002 |
| KR | 10-2004-0107535 | 12/2004 |
| WO | WO 2007/107090 | 9/2007 |

OTHER PUBLICATIONS

PCT International Search Report of PCT/CN2007/000848, form PCT/ISA/210, mailed Jul. 5, 2007, Applicant: Huawei Technologies Co., Ltd., 5 pages.

"Soft Handoff Groups for LBC," 3rd Generation Partnership Project 2, Sep. 11, 2006, pp. 1-18, Huawei Technologies Co. Ltd., et al.

* cited by examiner

METHOD AND SYSTEM FOR MANAGING RADIO RESOURCES FOR SOFT HANDOFF IN AN OFDMA-BASED COMMUNICATION SYSTEM

CROSS-REFERENCE TO RELATED APPLICATIONS

This application claims the benefits of U.S. provisional application Ser. No. of 60/839,972, filed on Aug. 24, 2006 and entitled "METHOD AND APPARATUS FOR ENABLING SOFT HANDOFF IN AN OFDMA-BASED COMMUNICATION SYSTEM and A SIGNALING PROTOCOL FOR SUPPORTING SOFT HANDOFF IN AN OFDMA BASED COMMUNICATION SYSTEM."

BACKGROUND OF THE INVENTION

The present invention relates to wireless communications, and more particularly to facilitating soft handoffs in a wireless communication system. Specifically, the present invention relates to the use of the common radio resources needed for soft handoff transmission in orthogonal frequency division multiplexing (OFDM) and orthogonal frequency division multiple access (OFDMA) communication systems.

Wireless communication systems divide areas of coverage into cells, each of which may be served by at least one predetermined base station. A mobile station will continuously monitor the signal strengths provided by the servicing base station of the current cell as well as those from adjacent cells. As the mobile station moves toward the edge of the current cell, the mobile station's signal strength is diminishing and increasing with regard to one base station and another respectively. The two base stations cooperate through the network, and determine whether the support of the communications should be switched to the adjacent base station from the current base station. The switching of control from one base station to another is referred to as a handoff.

A hard handoff is a handoff that drops the current connection with the current base station and then connects with the target base station. A soft handoff, on the contrary, allows the new connection to happen before dropping the old connection. First, the mobile station recognizes the viability of the second base station, and the network allows both the current and adjacent base stations to carry the call. As the mobile station move closer to the second base station and away from the first base station, the signal strength from the first base station will eventually drop below a predetermined threshold level. At this point, the first base station will drop the call and let the second base station continue servicing the call. In terms of call quality, soft handoffs have proven to be very reliable.

In the ever-continuing effort to increase data rates and capacity of wireless networks, communication technologies evolve and provide Multiple-input-multiple-output (MIMO) orthogonal frequency division multiplexing (OFDM) based systems representing an encouraging solution for the next generation high-speed data downlink access. A benefit of such systems is their high spectral efficiency wherein all of the allocated spectrum can be used by all base stations. The systems are generally considered to have a frequency reuse factor of one. Unfortunately, these systems generate strong co-channel interference, especially at cell borders.

In the OFDM based systems, for point-to-multipoint system such as that in the forward link, all resources of a base station are dedicated to a single mobile station at a time. The scheduler chooses the mobile station as much as possible with the best radio condition from among a set of mobile stations to send data to. If the set of mobile stations are large enough and that the channel fading of each mobile station is independent, there is almost always a mobile station in good radio condition to serve. Consequently, the base station avoids the expense of sending information to a mobile station in poor radio condition.

For the mobile station in cell edge, where it is in the boundary region between two or more sectors, even though the base station transmits to this mobile station with maximum power, the received signal is often received with very low power. As a result, this mobile station is in very poor radio condition and thus its data throughput is very low. This has several effects on system performance. The first is that if that particular mobile station requires a certain QoS, the base station must expend significant resources to serve this mobile station. The result of which is a significant decrease in total system throughput. The second is that the perceived mobile station experience for that mobile station is very poor due to the fact that the data rate that can be sustained with that link is very low. This is a significant issue because users expect to have the same user experience regardless of where they are located in the sector.

Consequently, soft handoff together with soft handoff group selection has been proposed to increase the throughput of mobile stations at the edge of a sector. However, in order to take advantage of soft handoff, common radio resources from the multiple sectors in the soft handoff group are needed to serve the mobile station. This is particularly complicated as the sub-carrier hopping pattern in an OFDM system may be different for each sector in order to randomize the intercell interference as seen by each mobile station. In other words, although the same logical resources are selected to serve the mobile station in soft handoff, with independent sub-carrier hopping among the different sectors, this will not necessary result in the same physical radio resources.

What are needed are technologies that will enable the efficient usage of common radio resources to be used for soft handoff in an OFDM system to improve the performance of mobile stations at the edge of the sector.

SUMMARY OF THE INVENTION

A method and system is disclosed for managing resource within a predetermined soft handoff group in an OFDM based telecommunications system. The present invention enables the efficient usage of the common radio resources needed for soft handoff transmission to mobile stations in the edge of a sector to improve its performance with reliable and minimal signaling overhead as well as minimal wastage of radio resources.

According to one embodiment of the present invention, logical radio resources are separated into at least one set to support the soft handoff group and at least one set for supporting normal communication traffic. At least one physical radio resource is identified for each logical radio resource in the set for supporting the SHOG according to a predetermined mapping function so as to minimize resource collision.

DETAILED DESCRIPTION

The present disclosure can be described by the embodiments given below. It is understood, however, that the embodiments below are not necessarily limitations to the present disclosure, but are used to describe a typical implementation of the invention.

The present invention provides methods to allow for the efficient usage of physical radio resources for soft handoff in an OFDMA-based communication system. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

In soft handoff, a mobile station receives its data simultaneously from more than one sector. These sectors that send the same information will be termed the sectors that participate in the soft handoff. A set of sectors that are participating in the soft handoff will be termed the soft handoff group (SHOG). The communications between the mobile station and the SHOG may use the same air interface frequency or time resources, may be synchronous and have identical data. The signals from the different sectors of the SHOG will be combined in the radio channel for an OFDM system. It should be noted that multiple SHOG's may exists in a system. At any one instant in time, the mobile may be served by only one SHOG. As it moves through out the system, the SHOG that serves the mobile will move from one SHOG to another SHOG.

Therefore in accordance with one aspect of the present invention, the resources that are used to serve the various mobile stations in a base station, whether it is in a distributed assignment zone or a localized assignment zone will be separated into two regions. One region will be called the potential soft handoff group (pSHOG) region and will be used to serve mobile stations in soft handoff. The other region will be called the normal traffic region and will be used to serve the mobile stations that are not being served in the pSHOG region. It should be noted that if the base station already contains separate regions for some other reason, then it may be convenient to use this separation instead of creating a different separation for the purpose of soft handoff.

In a preferred embodiment of this invention, logical radio resources are defined using a tree-form structure. The minimal radio resource assignment will constitute a base node of this tree structure. The set of base nodes are then separated into two sets. One set will form the pSHOG region and the other the normal traffic region.

In one embodiment of the invention, the pSHOG region itself maybe separated into multiple regions, each region will be the potential resources used by a particular SHOG. In another embodiment of the invention, the pSHOG region is not further separated and that multiple SHOGs share the pSHOG region in a dynamic fashion. It should now be noted that other alternative resource division and designation are possible. For example, the pSHOG region may be separated into multiple regions with each region used by a particular distinct group of SHOGs.

In an exemplary OFDMA wireless system, in order to identify and allocate resources for the handoff, the logical radio resources, which can be identified by a predetermined tree form, are mapped to align with a set of physical radio resources to be used. A different mapping mechanism or function is usually used for each sector of a wireless system in order to randomize the interference seen by any one particular mobile station. Furthermore, the mapping function is also a function of time that changes dynamically. Consequently, it can be viewed that the physical radio resource that is being used to support a logical radio resource allocation will "hop" or change from time to time. In this sense, the mapping function correlating the logical radio resource to the necessary physical radio resources is commonly called the hopping pattern.

As stated previously, the hopping patterns are different for each sector in order to avoid interferences. The consequence of this is that even if the same logical radio resources are used for the soft hand off transmission in each member sector of the SHOG, the physical radio resources may be different. As a result, in the embodiments of the present invention, the mapping functions are modified.

Figure 1:
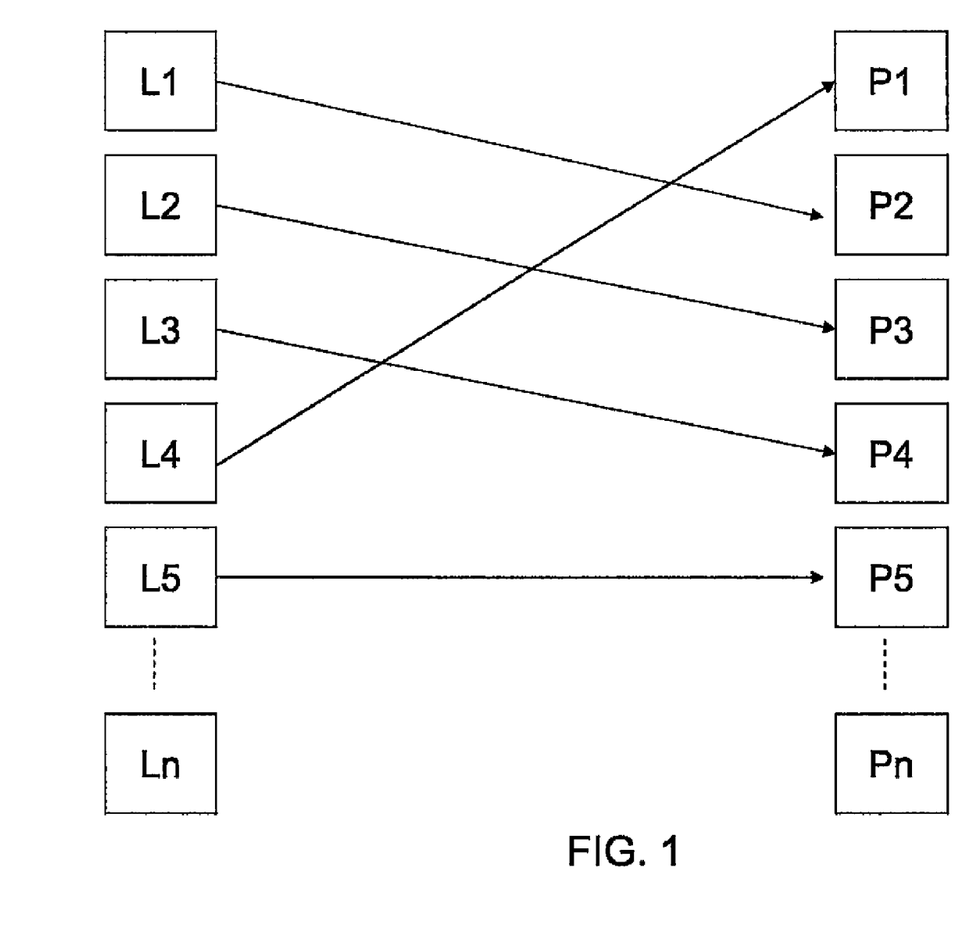
FIG. 1 is an illustrative depiction of mapping from the logical resources to physical resources.

To describe the modification, consider the illustrative mapping of logical radio resources to physical radio resources shown in FIG. 1. In this example, a set of logical radio resources L1, L2, L3 . . . Ln are mapped to a set of physical radio resources P1, P2, P3, . . . , Pn. The mapping function for this sector, which is denoted by B, can be written as B: L→P.

Figure 2:
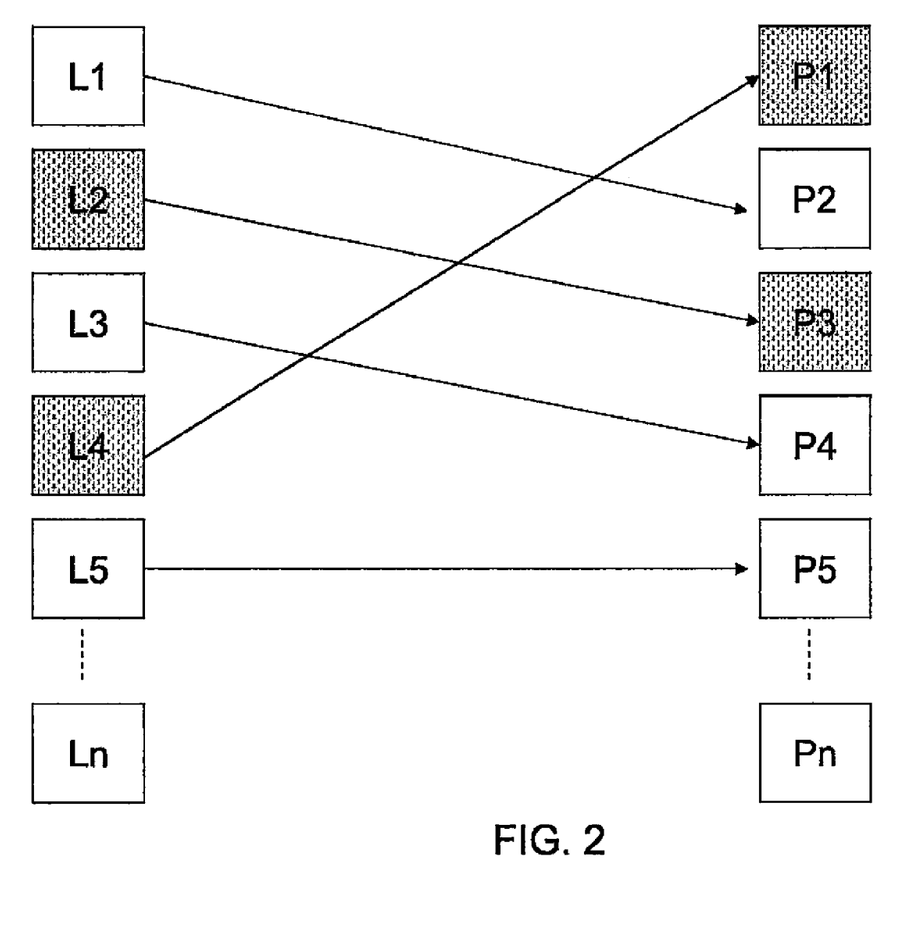
FIG. 2 is an illustrative example of separating the resources into two regions, one region for resource mapping for the soft handoff transmissions and one region for the normal traffic according one embodiment of the present invention.

FIG. 2 illustrates the case where the logical resources are separated into two or more regions. As shown in FIG. 2, the resources such as the available subcarriers are separated as one for pSHOG, and the rest for non-handoff operations. First, the physical resources that are associated with the SHOG region are determined. For example, it is determined that L1, L3 and L5 and their corresponding P2, P4, and P5 are locked up respectively. Once that is determined, the remaining resources that are not associated with the pSHOG region are then identified (or can be mapped). In this illustration, X: L→P denotes the logical to physical resource mapping associated with the SHOG.

Figure 3:
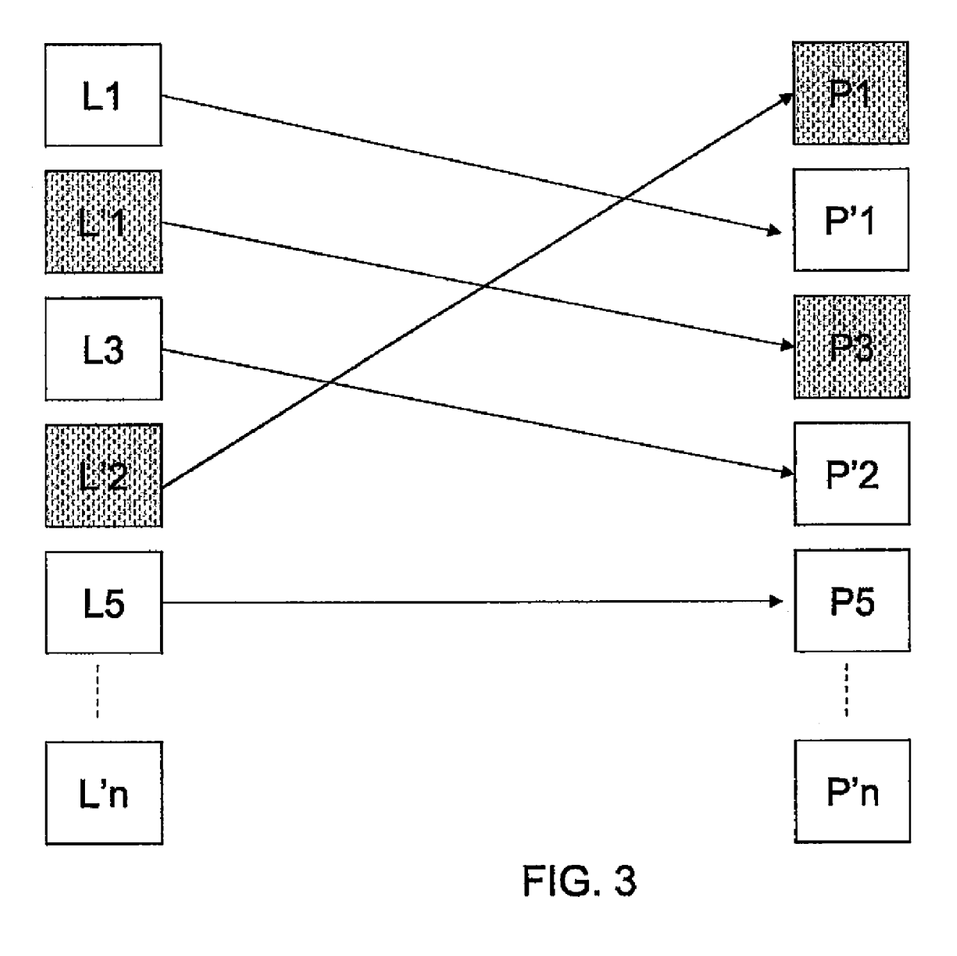
FIG. 3 illustrates an example of remapping resource nodes through relabeling.

FIG. 3 illustrates the resources after being relabeled. In this example, the selected L and P resources are "relabeled" as L' and P' resources for those that are not going to be associated with the soft handoff. It is understood that the relabeling is only one way to separating and identifying resources being occupied, and alternatively, any explicit rules can be defined to avoid the collision of using same resources between the different regions.

The regular mapping function that is defined for this sector, say B, is now applied on the relabeled resources. In other words, the mapping function B now only defines a mapping of the resources not in the SHOG region. That is, B: L'→P'.

The mapping function for the handoff X is, pertinent to this embodiment, made common for all members of the SHOG, while the mapping function for the normal traffic region B is then made different for each member sector of the SHOG.

It should now be clear to those skilled in the art that although the forgoing methodology was described for only two regions, applying this principle to more than two regions are obvious. For example consider a system defining two SHOG regions and 1 normal traffic region. First, apply the mapping function associated with SHOG region 1 to determine the physical resources associated with SHOG region 1. Secondly, all resources not associated with SHOG region 1 are remapped to exclude all used resources. Thirdly, apply the mapping function associated with SHOG region 2 to determine the physical resources associated with SHOG region 2. Thereafter, remap all resources not associated with SHOG regions 1 and 2. Finally another mapping function for this sector is used to determine the physical resource associated with and for the normal traffic region. It should be noted that the choice of which SHOG region should be first identified for determining its mapping of physical resources is arbitrary.

More specific to the OFDM based systems, for BRCH, DRCH, and BRCH/DRCH Multiplexing Mode 2 operation, consistent with the teaching above, SHOG resource assignment is performed first based on a predetermined SHOG mapping function. Once determined, the occupied physical resources such as the subcarriers are removed from future assignments. Then, resource assignment for non-SHOG is carried out according to sector specific mapping function.

For BRCH/DRCH Multiplexing Mode 1, resource assignment for BRCH in the SHOG can be performed first based on a predetermined mapping function. The used resources is then excluded from future assignment. Next, the resource assignment is done for BRCH not in the SHOG based on section specific mapping function. Once the resource assignment for BRCH is done, the same is performed for DRCH in the exact same manner.

In accordance with another aspect of the invention, once all the mapping is completed for various regions, the logical resources used for the SHOG region and its associated mapping function are communicated to the mobile station. In the preferred embodiment of this invention, this information is broadcast to the mobile in the preamble of a super frame. It should be noted that if there are more than one SHOG region, the mappings associated with each SHOG regions are communicated. It should be clear to those skilled in the art that other methods of communicating this information to the mobile station are possible such as for example using inband signaling.

Figure 4:
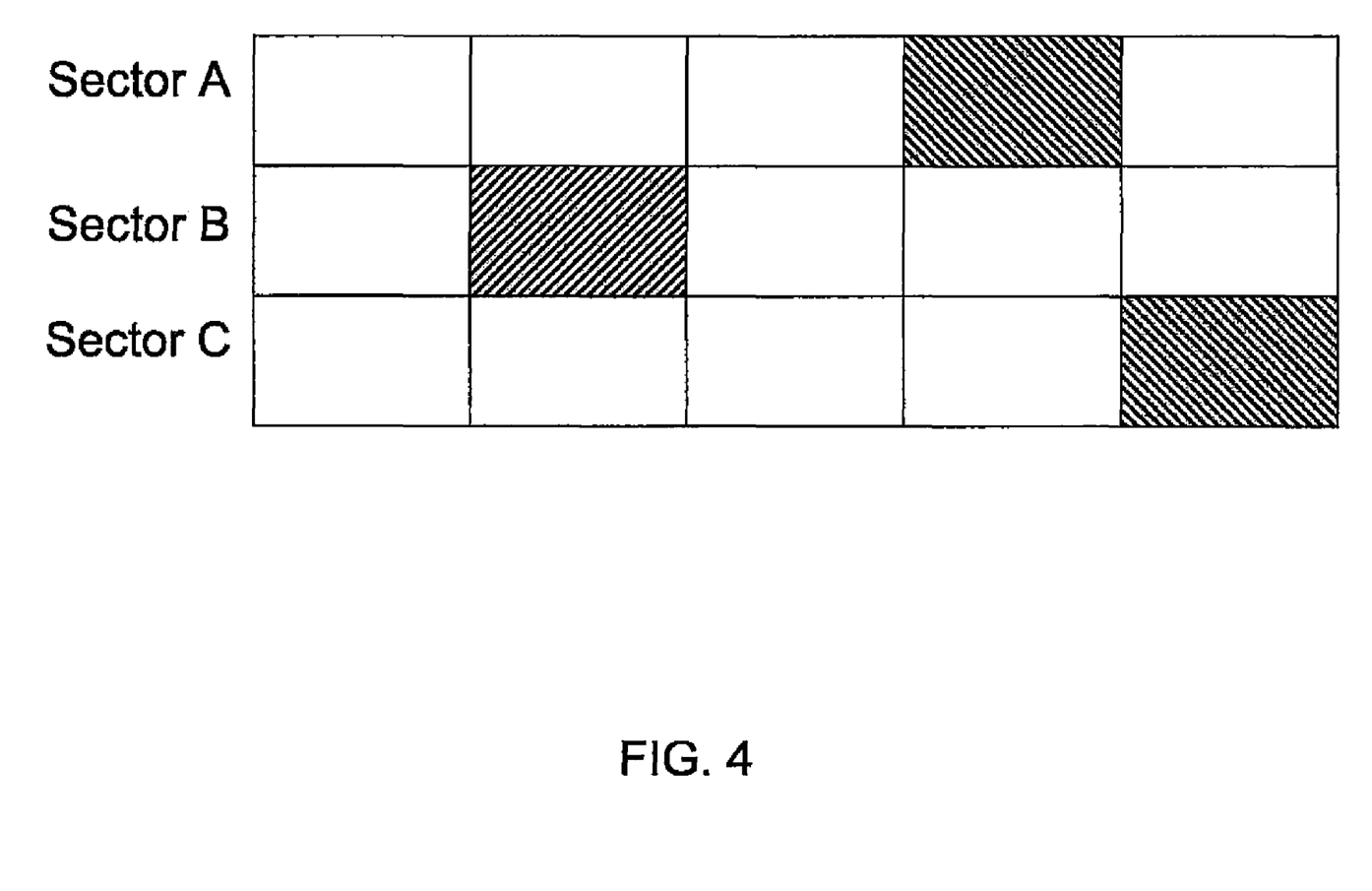
FIG. 4 illustrates an example of the puncturing of the common pilot into the SHOG region according to one embodiment of the present invention.

FIG. 4 illustrates a diagram representing a portion of a sub-carrier space that is use for the SHOG that consists of three sectors. In most OFDMA wireless systems, a common pilot is also transmitted by the base station to the mobile stations. The common pilot serves various purposes such as helping the mobile station determine when the mobile station enters a soft handoff region. Accordingly, in yet another aspect of the present invention, the common pilot can be "punctured" into the physical radio resources as shown in the illustrative example in FIG. 4. It can be seen that the common pilot punctures out the resources and those punctured resources are not used for transmission of data to the mobile station.

The common pilot takes away resources that can be used for the traffic. It should be noted that in an OFDM based system such as an OFDMA system, the transmissions from each sector of the SHOG are combined in the air. As shown in row three of FIG. 4, sector A is transmitting the common pilot, then the composite signal is a combination of the pilot and the normal data. To correctly decode the data from the composite signal, the common pilot from A must be removed from the composite signal, thereby leaving only the composite data information from sectors B and C in this situation. In other words, the channel estimate needed for detection is only the composite channel estimate of sector B and C. If there is no common pilot being transmitted, as shown in row 1 of FIG. 4, the channel estimate needed for detection is the composite channel estimate of sectors A, B and C.

In so doing, the traffic signal from the sub-carriers that contain the common pilot channel is now a signal that is composed of the signals from a subset of the SHOG. In order to correctly detect these symbols, a channel estimate must take into account that the signal is from only a subset of the SHOG with at least one sector transmitting a pilot. Consequently, in accordance to another aspect of this invention, the channel estimate used to detect these symbols is modified to account for the fact that the traffic transmission is only from a subset of the SHOG. More specifically, after allocating the physical resources, the mobile stations need to know the assignment detail so that they would know whether the common pilot is used by any sector and apply the appropriate channel estimate methods in order to detect the data correctly. There are several ways of getting the appropriate channel estimate when at least one sector is known to transmitting a pilot.

In the preferred embodiment of the invention, a receiver obtains the composite channel response from all members of the SHOG using a dedicated pilot. For those special channel estimates that correspond to symbols that have common pilot punctured in the signal from one or more of the base stations, it determines the channel response associated with each of the common pilot transmissions. The receiver then determines the composite channel response by summing the channel response associated with each of the common pilot transmission. The composite common pilot channel response is then subtracted from the composite channel response for all members of the SHOG to arrive at the channel estimate use to detect the data.

For example, for the detection of the symbol sent in the physical resources as represented by the third row of the FIG. 4, the receiver first determines the composite channel response, G, from Sectors A, B and C. As shown, each rectangular unit in FIG. 4 represents a subcarrier that is used for communications, and the textured units represent ones that are used for non-traffic signals such as the common pilot signals. It then determines the channel response, $G_A$ associated with the common pilot sent in Sector A. The channel response used for detection, $G_d$, is then obtained as $G_d=G-G_A$.

In yet another embodiment of this invention, the receiver determines the channel response from each member of the SHOG independently. It then, for each symbol, determines the channel estimate for traffic detection by summing up the channel response only from the members of the SHOG that were involved in the traffic transmission. For example, referring to the third row of FIG. 4 again, it can be seen that only Sectors B and C were involved in the traffic transmission for this symbol. Consequently, the receiver first determines the channel response for each member of the SHOG individually. That is it determines the channel response $G_A$, $G_B$, and $G_C$ for sector A, B, and C respectively. The channel estimate for detection, $G_d$, is then constructed as $G=G_B+G_C$.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for managing resources for sectors within a predetermined soft handoff group to participate in a soft handoff in an OFDM based telecommunications system, the method comprising:
   separating logical radio resources into at least one set to support a soft handoff group (SHOG) for performing soft handoff and at least one set for supporting normal communication traffic;
   identifying one or more physical radio resources for each logical radio resource in the set for supporting the SHOG according to a first mapping function that is common for all sectors of the SHOG; and
   identifying one or more physical radio resources for each logical radio resource in the set for supporting normal communication traffic according to a second mapping function that is different for each sector of the SHOG;
   wherein the physical radio resources used for supporting the SHOG are mutually exclusive from those used for supporting normal communication traffic.

2. The method of claim 1, wherein each set of the logical radio sources is dedicated to serve a predetermined SHOG.

3. The method of claim 1, wherein each set of the logical radio resources share resources with at least one other set of the logical radio resources.

4. The method of claim 1, wherein the mapping functions change in time so that the physical radio resources are allocated dynamically.

5. The method of claim 1, wherein the identifying at least one or more physical radio resources for each logical radio resource in the set for supporting the SHOG further includes re-labeling unused physical radio resources and their corresponding logical resources.

6. The method of claim 1, wherein the physical radio resources in the set for supporting normal communication traffic are different from sector to sector within the SHOG.

7. The method of claim 1, wherein the identifying one or more physical radio resources for each logical radio resource in the set for supporting the SHOG further includes identifying physical radio resources for block resource channel (BRCH) in the SHOG first.

8. The method of claim 1 further comprising communicating to a mobile station for informing logical resources used for the SHOG and the mapping functions.

9. The method of claim 1 further comprising excluding physical resources used by a common pilot.

10. The method of claim 9 further comprising channel estimating a combined signal by excluding the common pilot.

11. A system for managing resources for sectors within a predetermined soft handoff group to participate in a soft handoff in an OFDM based telecommunications system, the system comprising:
   logical radio resources separated into at least one set to support a soft handoff group (SHOG) for performing soft handoff and at least one set for supporting normal communication traffic;
   one or more physical radio resources identified for each logical radio resource in the set for supporting the SHOG according to a first mapping function that is common for all sectors of the SHOG; and
   one or more physical radio resources identified for each logical radio resource in the set for supporting normal communication traffic according to a second mapping function that is different for each sector of the SHOG;
   wherein the physical radio resources used for supporting the SHOG are mutually exclusive from those used for supporting normal communication traffic.

12. The system of claim 11, wherein the mapping functions change in time so that the physical radio resources are allocated dynamically.

13. The system of claim 11, wherein the physical radio resources in the set for supporting normal communication traffic are different from sector to sector within the SHOG.

14. A method for managing resources for sectors within a predetermined soft handoff group to participate in a soft handoff in an OFDM based telecommunications system, the method comprising:
   receiving one or more instructions with regard to at least one set of logical radio resources to support at least one soft handoff group (SHOG) used for a soft handoff and one or more associated mapping functions for identifying corresponding physical radio resources; and
   channel estimating a combined signal by excluding physical radio resources used for transmitting a common pilot by one or more predetermined sectors,
   wherein the logical radio resources for supporting the at least one SHOG are separated from at least one set of logical radio resources for supporting normal communication traffic, wherein one or more physical radio resources are identified for each logical radio resource in the set for supporting the SHOG according to a first mapping function that is common for all sectors of the SHOG, wherein one or more physical radio resources are identified for each logical radio resource in the set for supporting normal communication traffic according to a second mapping function that is different for each sector of the SHOG, and wherein the physical radio resources used for supporting the SHOG are mutually exclusive from those used for supporting normal communication traffic.

15. The method of claim 14, wherein each set of the logical radio resources share resources with at least one other set of the logical radio resources.

16. The method of claim 14, wherein the mapping functions change in time so that the physical radio resources are allocated dynamically.

17. The method of claim 14, wherein the physical radio resources for supporting normal communication traffic are different from sector to sector within the SHOG.

18. A method for managing resources for sectors within a predetermined soft handoff group to participate in a soft handoff in an OFDM based telecommunications system, the method comprising:
   separating logical radio resources into one or more sets to support one or more soft handoff groups (SHOGs) for performing soft handoff, wherein the one or more sets of logical radio resources are separated from at least one set of logical radio resources for supporting normal communication traffic; and
   identifying one or more physical radio resources for each logical radio resource in each of the sets for supporting a corresponding SHOG according to a first mapping function that is common to all sectors of the SHOG; and
   identifying one or more physical radio resources for each logical radio resource in the at least one set for supporting normal communication traffic according to a second mapping function that is different for each sector of the SHOG;

wherein the physical radio resources used for supporting the SHOG are mutually exclusive from those used for supporting normal communication traffic.

19. The method of claim 18, wherein each set of the logical radio resources is dedicated to serve a predetermined SHOG.

20. The method of claim 18, wherein each set of the logical radio resources share resources with at least one other set of the logical radio resource.

21. The method of claim 18, wherein the mapping functions change in time so that the physical radio resources are allocated dynamically.

22. The method of claim 18 further comprising communicating to a mobile station for informing logical resources used for the SHOG and the mapping functions.

23. The method of claim 18 further comprising excluding physical resources used by a common pilot.

* * * * *

UNITED STATES PATENT AND TRADEMARK OFFICE
CERTIFICATE OF CORRECTION

PATENT NO.        : 8,085,711 B2
APPLICATION NO.   : 11/844332
DATED             : December 27, 2011
INVENTOR(S)       : Soong et al.

It is certified that error appears in the above-identified patent and that said Letters Patent is hereby corrected as shown below:

In Col. 7, line 36, claim 5, delete "at least".

Signed and Sealed this
Twenty-seventh Day of March, 2012

David J. Kappos
*Director of the United States Patent and Trademark Office*